United States Patent
Triantafyllou Öste et al.

(10) Patent No.: US 7,160,564 B2
(45) Date of Patent: Jan. 9, 2007

(54) FERMENTED PRODUCT BASED ON AN OAT SUSPENSION

(75) Inventors: Angeliki Triantafyllou Öste, Lund (SE); Carina Andersson, Lund (SE); Olof Martensson, Lund (SE)

(73) Assignee: Ceba AB, Lund (SE)

( * ) Notice: Subject to any disclaimer, the term of this patent is extended or adjusted under 35 U.S.C. 154(b) by 0 days.

(21) Appl. No.: 10/416,265

(22) PCT Filed: Nov. 9, 2001

(86) PCT No.: PCT/SE01/02480

§ 371 (c)(1),
(2), (4) Date: Sep. 24, 2003

(87) PCT Pub. No.: WO02/37984

PCT Pub. Date: May 16, 2002

(65) Prior Publication Data

US 2004/0219261 A1 Nov. 4, 2004

(30) Foreign Application Priority Data

Nov. 10, 2000 (SE) .................................... 0004107

(51) Int. Cl.
*A23L 1/105* (2006.01)

(52) U.S. Cl. ............................. 426/52; 426/61; 426/618

(58) Field of Classification Search .................. 426/44, 426/49, 51, 52, 61, 618, 626, 583, 18; 435/252.9, 435/252.4

See application file for complete search history.

(56) References Cited

U.S. PATENT DOCUMENTS 5,686,123 A 11/1997 Lindahl et al.

FOREIGN PATENT DOCUMENTS

| EP | 0 988 793 | * | 3/2000 |
| FI | 88856 | | 4/1993 |
| WO | WO 99/18807 | | 4/1999 |

OTHER PUBLICATIONS

UK NCC Data Sheet; Strain Databases. Lactobacillus delbrueckii subsp. bulgaricus @ the NCIMB, re: strain NCFB 2772. Date N/A.*
"Fermentation properties of intestinal strains of Lactobacillus, of a sour dough and of a yoghurt starter culture in an oat-based nutritive solution" by I. Marklinder and C. Lonner, Food Microbiology, 1992, 9, 197-205.
"Lactic Acid Bacteria in an Oat-based Non-dairy Milk Substitute: Fermentation Characteristics and Exopolysaccharide Formation" by Olof Martensson et al., Levenm.-Wiss. u.-Technol., 33, 525-530 (Dec. 2000).
Kurka et al., A yohurt-like oat bran pudding: experiments and prospects. Poster, ICC 1991 Symposium Cereal Based Foods: New Developments, Prague, Czechoslovakia (Jun. 1991).

* cited by examiner

*Primary Examiner*—Keith Hendricks
(74) *Attorney, Agent, or Firm*—Dickstein, Shapiro, LLP.

(57) ABSTRACT

A fermented product selected from yogurt, yogurt drink, smothie, crème fraiche, sour cream, and spread is disclosed. The fermented product is based on an oat suspension essentially free from soy and dairy milk. Also disclosed is a process for preparing the product, and a starter culture useful in the process.

29 Claims, No Drawings

FERMENTED PRODUCT BASED ON AN OAT SUSPENSION

FIELD OF THE INVENTION

The present invention relates to a fermented product based on an oat suspension free from soy, to a process for making the product, and to a starter culture useful in the process.

BACKGROUND OF THE INVENTION

Traditionally fermented dairy products are prepared from dairy milk containing selected amounts of milk fat which is preserved in the respective product. It is well known that consumption of milk fat may increase blood cholesterol levels with concomitant increased risk of coronary heart disease. From a health perspective it is therefore desirable to keep the milk fat content of dairy products as low as possible. There are also people who should abstain from consuming dairy milk and certain dairy milk products due to lactose intolerance or allergy to milk protein. In Europe about one million people are allergic to milk protein. Also the number of consumers who prefer a vegetarian or vegan diet is increasing. Furthermore various groups of people exclude milk and milk products from a meal due to religious reasons, as is the case of kosher food. On the other hand, cow milk and products made therefrom, from the standpoint of taste, consistency, nutritional value, etc., are desirable for many of these people which for one reason or the other have to avoid their use. Thus, as an alternative to cow milk and products made therefrom soy milk and products, such as soy yogurt, based thereon have been developed and introduced on the market. Their use has however been hampered by many people suffering from milk allergy also developing allergy to soy protein.

Oats are acknowledged for their healthy properties. Oat protein is a good quality protein. Oats are rich in antioxidants and beta-glucan, a water-soluble dietary fibre, which exhibits cholesterol lowering properties. An oat-based milk alternative with a mild taste and flavour is known in the art. It may replace dairy milk in a range of applications. This oat-based milk substitute resembles dairy milk with respect to appearance and mouthfeel. It has a dry substance and sugar content similar to dairy milk but contains maltose and/or glucose instead of lactose. The oat-based milk alternative contains various sugars that are products of enzyme hydrolysis. By introducing this milk alternative in various foods the consumer's intake of dietary fibre is increased with concomitant health benefits, whereas the intake of milk fat is eliminated.

OBJECTS OF THE INVENTION

It is a prime object of the invention to provide a fermented non-dairy product low in protein and free from soy and dairy milk.

Thus, in particular, it is an object of the invention to provide a non-dairy yogurt suitable as a low-protein substitute for the corresponding dairy product.

Thus, in particular, it is an object of the invention to provide a non-dairy crème fraiche product suitable as a low-protein substitute of the corresponding dairy product.

Thus, in particular, it is an object of the invention to provide a non-dairy spread product suitable as a low-protein substitute of the corresponding dairy product.

Thus, in particular, it is an object of the invention to provide a non-dairy yogurt drink or smoothie product suitable as a low-protein substitute of the corresponding dairy product.

It is a further object of the invention to provide a non-dairy product of the aforementioned kind rich in soluble β-glucan fibre.

Additional objects of the invention will be evident from the following description of the invention and preferred embodiments thereof, and of the appended claims.

SUMMARY OF THE INVENTION

According to the present invention is disclosed a fermented product based on an oat suspension essentially free from soy and dairy milk, such as the suspension disclosed in U.S. Pat. No. 5,686,123, which is hereby incorporated by reference. The oat suspension has a smooth texture and mild taste; it has particularly smooth texture and mild taste when the insoluble fibre has been removed. Therefore the corresponding fermented product has an inherent smooth mouthfeel.

For the preparation of a fermented product according to the invention it is preferred to use an oat base in form of an aqueous oat suspension having a dry matter content of about 10% or a concentrated or dried form thereof, the oat base dry matter containing from about 10 to 50% by weight of monosaccharides, in particular maltose or a mixture of maltose and glucose, and from 30 to 80% by weight of maltodextrin. It is preferred for the oat base dry matter to contain from 5% by weight to 15% by weight of protein.

For the production of a fermented product according the invention having consistency properties similar to yogurt is preferred the use of an oat suspension containing about 20% of dry weight of maltose, the remainder of carbohydrates substantially consisting of maltodextrin of varying molecular weight. A suitable oat base material for making the yogurt-like fermented product of the invention is, for instance, Adavena® M20 marketed by Ceba AB, Lund, Sweden. The yogurt-like product of the invention has a consistency similar to that of natural yogurt in spite of having a low protein content, such as a protein content below 20% of dry weight, more preferred below 12% of dry weight. This consistency is achieved without taking recourse to the addition of gelatin or modified starch or other consistency moderating additives. It is thus preferred for the yogurt-like product of the invention to be substantially free from consistency moderating additives.

For the production of a fermented product according the invention having consistency properties similar to crème fraiche or sour cream is preferred the use of an oat suspension containing about 20% of dry weight of maltose, the remainder substantially consisting of maltodextrin capable of forming a gel. A suitable oat base material for making the crème fraiche-like fermented product of the invention is, for instance, Adavena M20 marketed by Ceba AB, Lund, Sweden. Despite the differences in protein content between dairy milk and the oat base used in the invention, fermented oat products such as the aforementioned crème fraiche-like product can be prepared.

For making the yogurt smoothie fermented product according the invention having consistency properties similar to a yogurt drink or smoothie is preferred the use of an oat suspension containing about 40% of dry weight of maltose, the remainder of carbohydrates substantially consisting of maltodextrin of varying molecular weight. A suitable oat base material for making the crème fraiche-like fermented product of the invention is, for instance, Adavena M40 marketed by Ceba AB, Lund, Sweden.

For making the spread-like fermented product according the invention (referred to as "spread" in the following) having consistency properties similar to a spread is preferred the use of an oat suspension containing about 20% of dry weight of glucose, the remainder of carbohydrates substantially consisting of maltodextrin of varying molecular weight. A suitable oat base material for making the yogurt-like fermented product of the invention is, for instance, Adavena® G20 marketed by Ceba AB, Lund, Sweden manufacturing a range of Adavena® oat base products. The yogurt-like product of the invention has a consistency similar to that of natural yogurt in spite of having a low protein content, such as a protein content below 20% of dry weight, more preferred below 12% of dry weight. This consistency is achieved without taking recourse to the addition of gelatin or modified starch or other consistency moderating additives. It is thus preferred for the yogurt-like product of the invention to be substantially free from consistency moderating additives.

According to a first preferred aspect of the invention the oat milk suspension is fermented with lactic acid bacteria. Thereby a thickened product of lower pH is obtained. It is preferred to use a conventional yogurt starter culture, such as one comprising *Lactobacillus delbruckii* subsp. *bulgaricus* and *Streptococcus thermophilus*, complemented with *Lactobacillus acidophilus*. Thereby a more acidic product is obtained, since *Lactobacillus acidophilus* ferments maltose better than conventional yogurt starter cultures. It is also preferred to use a starter culture devoid of such hydrolytic activity that would reduce the fibre content of the oat product, such as a starter culture having β-glucanase activity. The reason for the advantageous effect obtained by complementation with *L. acidophilus* may be due to the buffer capacity of the oat base being much lower than that of dairy milk due to its low protein content. When the oat base is fermented the pH decreases rather quickly. Thereby the growth of *L. bulgaricus* and *S. thermophilus* is increasingly inhibited while that of *L. acidophilus* is only moderately affected or not affected at all. This property is important since it helps the taste and aroma typical of yogurt to develop.

The thickening of dairy yogurt is due to the coagulation of milk protein. The protein in dairy yogurt supports the formation of a strong gel by calcium caseinate forming a characteristic network in an acidic environment. Soy protein exhibits similar thickening properties. The protein content of oat-based milk alternative is low compared with the protein content of dairy milk and milk-like soy products. The lack of a strong protein network in the oat product having consistency substantially different from that of its soy or dairy counterparts.

According to a second preferred aspect of the invention, exopolysaccharide (EPS)-producing microorganisms (see, for instance: A Ricciardi and F Clementi, Exopolysaccharides from lactic acid bacteria: structure, production and technological applications, *Ital J Food Sci* 12 (2000) 23–45) are included in the inoculum for improving the consistency of the fermented oat product. Wild type microorganisms or microorganisms that contain the gene for production of EPS may be used. These extra-cellular polysaccharides have a synergistic effect in combination with the maltodextrin and beta-glucan of the oat-based milk alternative thereby yielding a desirable product texture. While their addition increases both the viscosity and the elasticity of the product, the increase in elasticity is considerably more pronounced.

An addition of EPS producing microorganisms is particularly preferred in the production of spreadable products according to the invention. The EPS-producing microorganisms of the invention are preferably added in an amount of from 10 to 50% by weight, and even up to 80%, such as by substituting the state-of-the-art *L. delbruckii* subsp. *bulgaricus* variety by from 10 to 50% by weight, and even up to 80% by weight, of *L. delbruckii* subsp. *bulgaricus* NCFB 2772.

The exopolysaccharides may be of a sort readily digestible by humans or may constitute dietary fibre, such as microbial beta-glucan. The fibre content of the yogurt-like product is thus enhanced with no extra addition of fibre.

According to a third preferred aspect of the invention the colour of the fermented product is improved by the method of the invention. While the oat base has grayish tint typical for suspensions of cereal material, the fermented product of the invention has a white appearance similar to that of the corresponding dairy milk-derived products.

According to fourth preferred aspect of the invention calcium may be optionally added as calcium hydrogen phosphate $CaHPO_4.2H_2O$ or $Ca_3(PO_4)_2$. A dosage of 0.5% by weight of dry oat base corresponds to the concentration of calcium in dairy milk and is preferred.

According to a fifth preferred aspect of the invention the products according to the invention contain more than 0.3% by weight of soluble β-glucan, in particular more than 0.5% of soluble β-glucan.

The fermented product can have a protein content of below 4% by weight, such as from 0.5% to 2.0% by weight.

Further preferred aspects and advantages of the invention are disclosed in the appended claims and in the following detailed description of the invention referencing to a number of illustrative but not limiting examples.

PREFERRED EMBODIMENTS OF THE INVENTION

Oat-based materials in general. Commercial grade Adavena® products were used as oat base. They are aqueous suspensions having a dry matter contend of about 10%, similar to cow milk; they can be concentrated without difficulty by evaporation to a dry matter content of about 25% or dried to a powder. While the dry matter protein content of cow milk is from about 32% by weight to about 36% by weight, the dry matter protein content of the oat-based Adavena® products is from about 11% by weight to about 14% by weight. On the other hand protein in oat-based products like the Adavena® line is better balanced in respect to carbohydrates and fat than the protein in milk. This is not true for all cereals; rice milk, for instance, is poor in protein.

EXAMPLE 1

Non-dairy Yogurt A

Ingredients:

Oatbase: Adavena® M20, (CEBA AB, Lund, Sweden; dry matter containing 20% by weight of maltose), adjusted to a dry matter content 14–16%.

Starter culture: An ordinary yogurt starter culture of *Lactobacillus bulgaricus* and *Streptococcus thermophilus* complemented with *Lactobacillus acidophilus*. Add starter culture in amounts as for ordinary milk yogurt, 0.02% by weight of starter culture from a concentrated frozen pellet, such as comprised to 75% by weight of ordinary starter culture (*L. bulgaricus* and *S. thermophilus*), and to 25% by weight of *L. acidophilus*.

Process:
1. Weigh Adavena® M20 powder;
2. Weigh the amount of water needed to reach a dry matter content of 14% by weight when added to the M20 Adavena powder;
3. Add a small amount of the water to the M20 powder and mix to a homogenous slurry;
4. Add the remaining water to the M20 slurry;
5. Heat the slurry to 90° C.; hold this temperature for 6 minutes to pasteurize the product;
6. Cool to incubation temperature, 43° C.;
7. Inoculate with starter culture; incubate at 43° C. for 16 hours;
8. Cool below 8° C. for storage.

The viscosity of the M20 oat base (at 14% by weight of dry solids) was 80,000 cP. The viscosity of the fermented oat base was 120,000 cP. The measurement was performed at 4° C. with a Brookfield viscosimeter at a shear rate of 0.3 rpm to protect the product structure against deformation due to shear stress.

The fermented product has a fairly low pH value (about 3.9), but after adding flavor its taste is only slightly sour. The fermentation can be interrupted at a higher pH value if desired. The fermented oat base may be flavoured with, for instance, vanilla, cocoa, hazelnut, caramel or with different kinds of jam, such as mango, pineapple, peach, apple, etc.; by definition jam is a food made by cooking fruit with a large amount of sugar).

EXAMPLE 2

Non-dairy Yogurt B

Ingredients and process as in Example A except for substituting 30% by weight of *L. delbruckii* subsp. *bulgaricus* variety used in Example 1 by the same amount of *L. delbruckii* subsp. *bulgaricus* NCFB 2772 obtained from the National Culture Collection of Food Bacteria, Aberdeen, Scotland. The texture of the yogurt product is determined as elasticity (or ropiness) by measurement with an Instron 4442 (Instron Ltd., High Wycombe, Buckinghamshire, UK) using a platen with a diameter of 3.8 cm and a speed of 100 cm/min. The elasticity value for a product obtained by using a traditional starter culture lacking exopolysaccharide producing microorganisms was found to be about 2 cm/min whereas that of a product obtained by use of a corresponding starter culture comprising of *L. delbruckii* subsp. *bulgaricus* NCFB 2772 was found to be about 6 cm/min.

EXAMPLE 3

Non-dairy Spread

Adavena® G20 oat base suspension (17% by weight of dry solids; dry matter containing 20% of glucose) was fermented with the starter culture of Example 2 for the preparation of a spread. The viscosity of the spread was in the order of 1,000,000. Elasticity measurement with an Instron 4442 instrument showed an elasticity increase from about 2 cm/min to about 7 cm/min in case of the use of a starter culture comprising *L. delbruckii* subsp. *bulgaricus* NCFB 2772. The viscosity in the spread was in the order of 1,000,000 cP at 4° C. and 0.3 rpm.

EXAMPLE 4

Non-dairy Smoothie

Adavena® M40 oat base suspension (dry solids content 7–15%; dry solids containing 40% by weight of maltose). Starter culture as in Example 1.

Process:
1. Weigh Adavena® M40 powder;
2. Weigh the amount of water needed to reach a dry matter content of 10% M40;
3. Add a small amount of the water to the M40 powder and mix to a homogeneous slurry;
4. Add the remaining water to the M40 slurry;
5. Heat the slurry to 90° C.; hold this temperature for 6 minutes to pasteurize the product;
6. Cool to incubation temperature, 43° C.;
7. Inoculate with starter culture; incubate at 43° C. for 16 hours;
8. Cool below 8° C. for storage.

Alternatively a commercial liquid Adavena® M20 oat base suspension having a dry matter content of from 7% to 12 can be used. When using such a ready-made suspension steps 1–4 of the process can be dispensed with. The suspension used directly for step 5. The alternative of using a commercial liquid Adavena® oat base suspension of appropriate kind as a raw material is also applicable to the other Examples described herein.

The fermented product will reach a fairly low pH value of about 4.0 but after adding flavour the taste will be only slightly sour. The fermentation can be interrupted at a higher pH value if desired. While the viscosity of the non-diary smoothie was about 30,000 cP at at 4° C. and 0.3 rpm.

EXAMPLE 5

Non-dairy Crème Fraiche or Sour Cream

Prepared by a modification of Example 1 from Adavena® M20 oat base suspension (7–12% of weight dry matter) but using a crème fraiche culture and incubating at an optimal temperature for this culture, 36° C. The starter culture, 0.02% by weight of concentrated frozen pellet, comprised equal amounts of a crème fraiche culture (consisting of *Lactococcus lactis* subsp. diacetylactis and *Leuconostoc mesenteroides* subsp. *cremoris*; manufactured by Chr. Hansen AB, Flygfä. 11, Göteborg, Sweden), and *Lactobacillus acidophilus*. The viscosity of the non-dairy crème fraiche product or sour cream product of the invention was in the order of 1,000,000 cP but difficult to measure. If desired an EPS-producing microorganism like L. delbruckii subsp. bulgaricus NCFB 2772 can be added to the starter culture or later to increase the viscosity of the product.

The invention claimed is:

1. A process for preparing a fermented product selected from the group consisting of yogurt, yogurt drink, smoothie, crème fraiche, sour cream and spread based on an oat suspension free from soy and dairy milk, the process comprising:
    (a) providing an oat base in form of an aqueous oat suspension free from soy and dairy milk and having a dry matter content of 7–17%, the oat base dry matter comprising from 10 to 50% by weight of maltose or a mixture of maltose and glucose, from 30 to 80% by weight of maltodextrin and from 5% to 15% by weight of protein;

(b) heating the suspension to a first temperature above 80° C.;

(c) holding the suspension at this first temperature for a time period sufficient to pasteurize the product;

(d) cooling the suspension to a second temperature of from about 30° C. to about 50° C.;

(e) inoculating the suspension with a starter culture at the second temperature;

(f) incubating the suspension at the second temperature for a time period sufficient to ferment the suspension to the desired fermented product; and (g) cooling the fermented product so obtained to a temperature below 8° C. for storage;

wherein the oat suspension is optionally agitated in one or more of the (b) to (g) to prevent it from settling.

2. The process of claim 1, wherein the first temperature is about 90° C.

3. The process of claim 1, wherein the second temperature is about 43° C.

4. The process of claim 1, wherein the starter culture comprises *Lactobacillus delbruckii* subsp. *blugaricus* and *Streptococcus thermophilus*.

5. The process of claim 1, wherein the starter culture comprises *Lactobacillus acidophilus*.

6. The process of claim 1, wherein the starter culture comprises an exopolysaccharide (EPS) producing microorganism.

7. The process of claim 6, wherein the EPS producing microorganism is *L. delbruckii* subsp. *bulgaricus* NCFB 2772.

8. The process of claim 6, further comprising at least one of *Lactobacillus bulgaricus, Streptococcus thermophilus, Lactobacillus acidophilus, Lactococcus lactis* subsp. *diacetylactis, Leuconostoc mesenteroides* subsp. *cremoris*.

9. The process of claim 8, wherein the EPS-producing organism is *L. delbruckii* subsp. *Bulgaricus* NCFB 2772.

10. The process of claim 1, wherein the dry matter protein content of the oat base is less than 12% by weight.

11. The process of claim 10, wherein the dry matter maltose content is about 20–40% by weight.

12. A fermented product selected from the group consisting of yogurt, yogurt drink, smoothie, crème fraiche, sour cream and spread, prepared by the process of claim 1.

13. The fermented product of claim 12 comprising calcium hydrogen phosphate, calcium phosphate or both, in an amount of about 0.5% by weight of dry oat base.

14. The fermented product of claim 12 comprising more than 0.3% by weight of soluble β-glucan.

15. The fermented product of claim 14, comprising more than 0.5% of soluble β-glucan.

16. A yogurt of claim 12, wherein the dry matter content of said aqueous oat suspension is 14–16% by weight, and contains about 20% of maltose based on dry weight.

17. The yogurt product of claim 12, free from consistency modifying additives.

18. The yogurt product of claim 17, having a viscosity of about 120,000 cP measured at 4° C. with a Brookfield viscosimeter at a shear rate of 0.3 rpm.

19. A yogurt drink or smoothie product of claim 12, wherein the dry matter content of said aqueous oat suspension is 7–15% by weight, and contains about 40% of maltose based on dry weight.

20. A yogurt drink or smoothie product of claim 12, free from consistency modifying additives.

21. A smoothie of claim 12, having viscosity of about 30,000 cP measured at 4° C. with a Brookfield viscosimeter at a shear rate of 0.3 rpm.

22. A crème fraiche or sour cream product of claim 12, wherein the dry matter content of said aqueous oat suspension is 7–12% by weight, prepared from an oat base containing about 20% of maltose based on dry weight.

23. A crème fraiche or sour cream product of claim 12, free from consistency modifying additives.

24. A spread product of claim 12, wherein the dry matter content of said aqueous oat suspension is 17% by weight, prepared from an oat base containing maltose and glucose in which the glucose is about 20% based on dry weight.

25. A spread product of claim 12, free from consistency modifying additives and having a viscosity above 500,000 cps measured at 4° C. with a Brookfield viscosimeter at a shear rate of 0.3 rpm.

26. The fermented product of claim 12, having a protein content of below 4% by weight.

27. The fermented product of claim 15, having a protein content of from 0.5% to 2.0% by weight.

28. A process for preparing a fermented product selected from the group consisting of yogurt, yogurt drink, smoothie, crème fraiche, sour cream and spread based on an oat suspension free from soy and dairy milk, the process comprising:

(a) providing an oat base in form consisting of an aqueous oat suspension free from soy and dairy milk and having a dry matter content of 7–17%, the oat base dry matter comprising from 10 to 50% by weight of maltose or a mixture of maltose and glucose, from 30 to 80% by weight of maltodextrin and from 5% to 15% by weight of protein;

(b) heating the suspension to a first temperature above 80° C.;

(c) holding the suspension at this first temperature for a time period sufficient to pasteurize the product;

(d) cooling the suspension to a second temperature of from about 30° C. to about 50° C.;

(e) inoculating the suspension with a starter culture at the second temperature;

(f) incubating the suspension at the second temperature for a time period sufficient to ferment the suspension to the desired fermented product; and (g) cooling the fermented product so obtained to a temperature below 8° C. for storage;

wherein the oat suspension is optionally agitated in one or more of the (b) to (g) to prevent it from settling.

29. A process for preparing a fermented product selected from the group consisting of yogurt, yogurt drink, smoothie, crème fraiche, sour cream and spread based on an oat suspension free from soy and dairy milk, the process consisting of:

(a) providing an oat base in form of an aqueous oat suspension free from soy and dairy milk and having a dry matter content of 7–17%, the oat base dry matter comprising from 10 to 50% by weight of maltose or a mixture of maltose and glucose, from 30 to 80% by weight of maltodextrin and from 5% to 15% by weight of protein;

(b) heating the suspension to a first temperature above 80° C.;

(c) holding the suspension at this first temperature for a time period sufficient to pasteurize the product;

(d) cooling the suspension to a second temperature of from about 30° C. to about 50° C.;

(e) inoculating the suspension with a starter culture at the second temperature;

(f) incubating the suspension at the second temperature for a time period sufficient to ferment the suspension to the desired fermented product; and
(g) cooling the fermented product so obtained to a temperature below 8° C. for storage;

wherein the oat suspension is optionally agitated in one or more of the (b) to (g) to prevent it from settling.

* * * * *